(12) United States Patent
Amano

(10) Patent No.: US 11,386,436 B2
(45) Date of Patent: Jul. 12, 2022

(54) METHOD AND SYSTEM FOR AUTHENTICATION AND ANTI-COUNTERFEITING USING COFFEE-RING EFFECT

(71) Applicant: KONICA MINOLTA BUSINESS SOLUTIONS U.S.A., INC., San Mateo, CA (US)

(72) Inventor: Jun Amano, Hillborough, CA (US)

(73) Assignee: KONICA MINOLTA BUSINESS SOLUTIONS U.S.A., INC., San Mateo, CA (US)

( * ) Notice: Subject to any disclaimer, the term of this patent is extended or adjusted under 35 U.S.C. 154(b) by 359 days.

(21) Appl. No.: 16/836,729

(22) Filed: Mar. 31, 2020

(65) Prior Publication Data

US 2021/0304217 A1 Sep. 30, 2021

(51) Int. Cl.
*G06Q 30/00* (2012.01)
*G06K 19/06* (2006.01)

(52) U.S. Cl.
CPC ..... *G06Q 30/018* (2013.01); *G06K 19/06084* (2013.01); *G06K 19/06178* (2013.01)

(58) Field of Classification Search
CPC ........... G06Q 30/018; G06K 19/06084; G06K 19/06178; B41M 5/0047
See application file for complete search history.

(56) References Cited

U.S. PATENT DOCUMENTS 10,494,534 B2 * 12/2019 McManus ............... C09D 11/30
10,787,004 B2 *  9/2020 Ohnishi ............... B41J 11/0021

OTHER PUBLICATIONS

Mampallil et al., "A review on suppression and utilization of the coffee-ring effect", Advances in Colloid and Interface Science, 2018, vol. 252, pp. 38-54.
Shimobayashi et al., "Suppression of the coffee-ring effect by sugar-assisted depinning of contact line", Scientific Reports, 2018, 8:17769; DOI:10.1038/S41598-018-35998-w.
Soltman et al., "Inkjet-Printed Line Morphologies and Temperature Control of the Coffee Ring Effect", Langmuir, 2008, vol. 24, pp. 2224-2231.

* cited by examiner

*Primary Examiner* — Seung H Lee
(74) *Attorney, Agent, or Firm* — Squire Patton Boggs (US) LLP

(57) ABSTRACT

A method and system providing an anti-counterfeiting label or mark, using ordinary inkjet printers, take advantage of a phenomenon called a coffee ring pattern, something that inkjet printers. Even the same inkjet printer can output different patterns under different conditions. As a result, the likelihood of reproduction of a particular printer's coffee ring pattern using another printer is so low as to be negligible. It is possible to capture images of the coffee rings using a smartphone camera. The coffee ring approach may be used on any labels or packages on which inkjet printing can be used.

20 Claims, 5 Drawing Sheets

METHOD AND SYSTEM FOR AUTHENTICATION AND ANTI-COUNTERFEITING USING COFFEE-RING EFFECT

BACKGROUND OF THE INVENTION

Aspects of the present invention relate to anti-counterfeiting; more particularly, to a method and system for authentication and anti-counterfeiting; and still more particularly, to such a method and apparatus that takes advantage of unique printer characteristics.

Counterfeit products are a growing problem for businesses all over the world, in a variety of industries such as pharmaceuticals, food, cosmetics, and high-tech, among others. Such counterfeiting results in huge economic losses and even possible consumer harm.

There are anti-counterfeiting techniques that use either overt features, covert features, or a mixture of the two. Overt features are noticeable details, for example, in a product label. Examples of overt features include a watermark or a 2D bar code. Alternatively or in addition, such a product label also may have covert features, such as a hologram or microtext. Detecting such overt or covert features can require sophisticated tools, and can be expensive to implement.

It would be desirable to have a simpler anti-counterfeiting system that is easier and less expensive to implement.

SUMMARY OF THE INVENTION

Aspects of the present invention relate to an authentication and anti-counterfeit mark, placed on packages and/or packaging labels, using unique properties of printers, particularly inkjet printers. More particularly, aspects of the invention take advantage of an inkjet printer characteristic known as the "coffee ring" effect. According to an embodiment, ink may include one or more additives to enhance the coffee ring effect and make it easier to detect.

DETAILED DESCRIPTION

Figure 1:
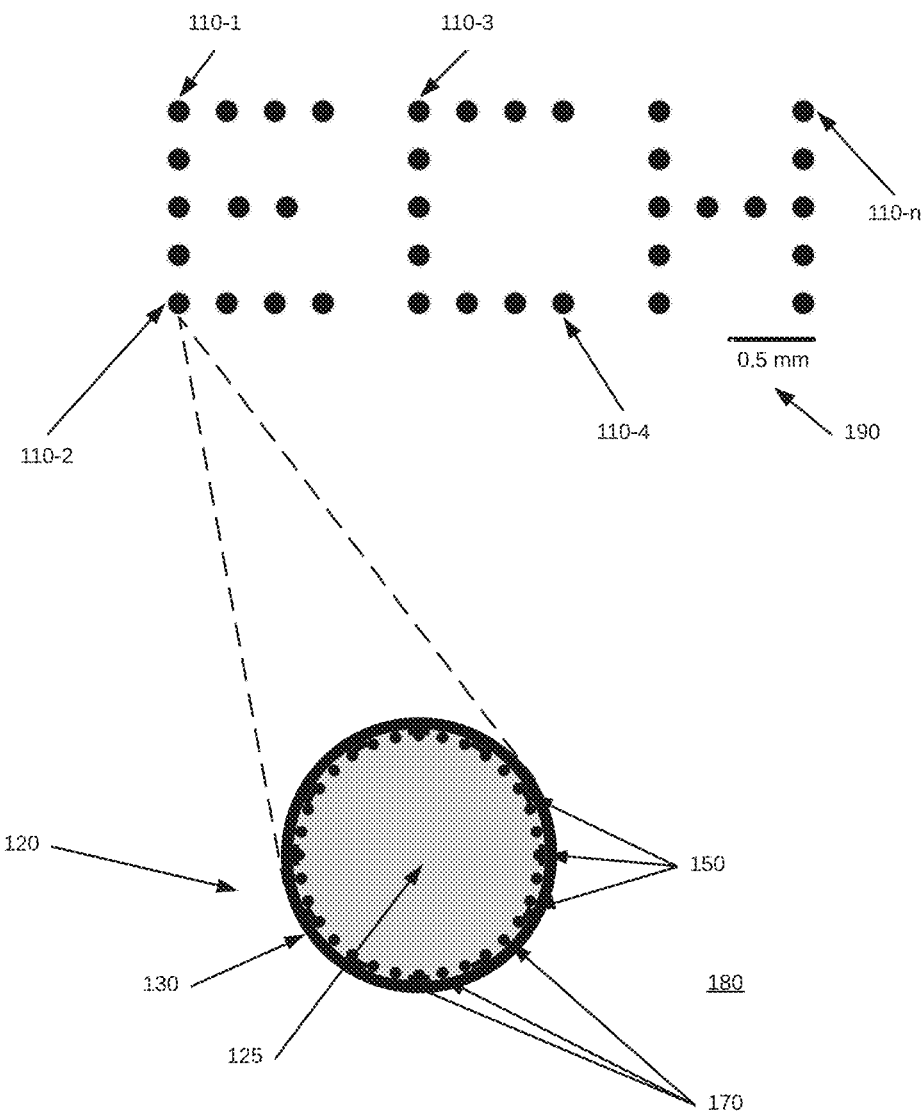
FIG. 1 shows an example of a dot that an inkjet printer makes, blown up to show coffee ring features.

Inkjet printers produce text and images on printing surfaces. Dots of ink coming out of an inkjet printer head are very small. As the ink dots dry on an absorbent surface such as standard printing paper, the dots tend to become increase in size by a capillary effect, typically to around 0.1 to 0.5 mm in diameter. A number of criteria can affect the appearance of an inkjet dot on a printing surface after the dot dries. Such criteria may include, but are not limited to, porosity and/or absorbency of the printing surface; ambient temperature; ambient humidity; amount of ink in a printing cartridge; type and/or color of ink in a printing cartridge; status and/or condition of printheads; and/or contrast between the ink and the printing surface. This list is not intended to be exhaustive. Rather, the list sets forth examples of possibly relevant criteria. Ordinarily skilled artisans will appreciate that there may be others.

As can be appreciated from these just-listed criteria, printing conditions can vary widely, so that no two dots from same inkjet printer will necessarily look alike. It is virtually certain that no two dots from different inkjet printers will look alike. Aspects of the present invention operate on the assumption that all inkjet printer dots, particularly dots from different printers, will be different.

The appearance of inkjet printer dots with coffee rings has been considered to be undesirable, because of possible adverse impacts on appearance of printed text and images. The undesirability of this appearance has motivated efforts to eliminate the coffee ring effect. In contrast, aspects of the present invention take advantage of the coffee ring effect. In an embodiment, the effect may be enhanced through one or more additives, to facilitate detection. The appearance of the coffee ring effect may be less undesirable in product packaging and labels, making it possible to take advantage of the effect without adverse impact on appearance. But in one aspect, a separate ink dot may be printed on a label as a unique marker. In an aspect, handheld devices, such as smartphones and tablets with cameras, may be able to record an image of the coffee ring and use the image to verify the origin of a product, as an anti-counterfeiting measure.

Putting these unique patterns on labels and/or packages, and detecting the patterns, makes it possible to use these patterns to authenticate a product or package and, in one aspect, its origin, to facilitate authentication and prevent counterfeiting. In one aspect, a dot may be printed separately on a label or packaging. That dot would be a fingerprint of sorts. Either alone or with metadata, the dot would be unique for each label or package.

For a given product, line of products, family of products, or product line that a company may sell, depending on volume, handling a system with a very substantial number of coffee ring dots quickly can become a "Big Data" problem, requiring storage and processing capacity sufficient to effect an efficient comparison of input data to the large amount of stored data. In one aspect, the metadata may facilitate the comparison by narrowing down the number of coffee rings to be searched.

FIG. 1 shows an example of lettering using inkjet printer. Dots 110-1 to 110-*n* are individual dots that spell letters. The dots are shown with greater separation for ease of visualization. The dots could form other patterns. Dot 120 is a blown-up version of dot 110-2. A center 125 of dot 120 is shaded gray to make elements 130, 150, and 170 more visible.

Ring 130 runs around a periphery of dot 120. Patterns 150 and 170, along with ring 130, form what is known as a coffee ring 180. Patterns 150 and 170 are merely illustrative. The various conditions outlined above will tend to make the coffee ring pattern essentially random. Scale 190 depicts an approximate scale of a dot 120 and its coffee ring 180.

Figure 2A:
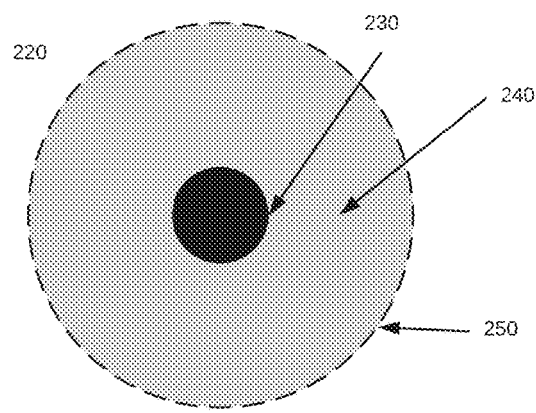
FIGS. 2A-2D show various details of inkjet printer dots.

FIG. 2A shows an area where an ink spot will be provided. Spot 220 depicts the relative size of an ink dot that an inkjet printer puts on a surface after it dries. The dot 230 is the original size of the ink spot that the printer puts on the surface. Gray area 240 shows the general area of the ink spot after it dries. Dotted line 250 shows an outer periphery of the dot after it dries.

Figure 2B:
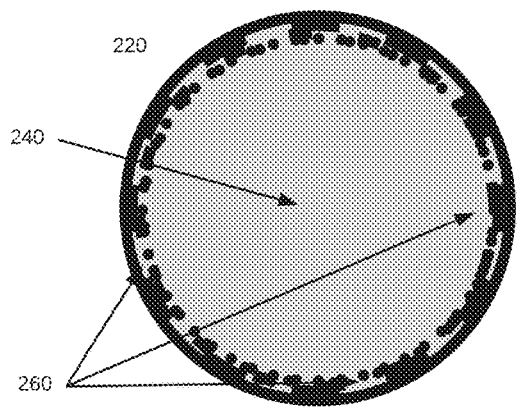
Figure 2C:
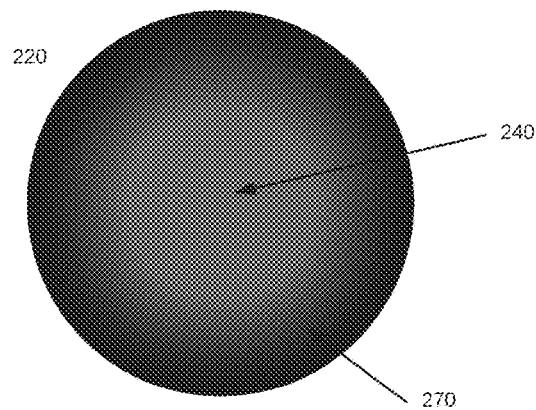
Figure 2D:
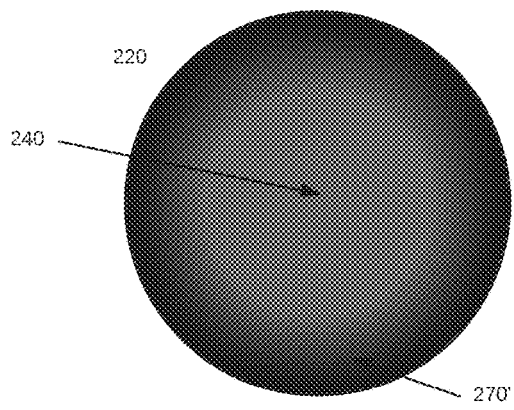

FIG. 2B depicts an exemplary coffee ring pattern after ink dot 230 in FIG. 2A dries and spreads through capillary action to an outer periphery of spot 220, forming coffee ring 260. FIGS. 2C and 2D show other types of possible coffee ring formation, with coffee ring patterns 270 (FIG. 2C) and 270' (FIG. 2D) at an outer periphery of spot 220.

Figure 3:
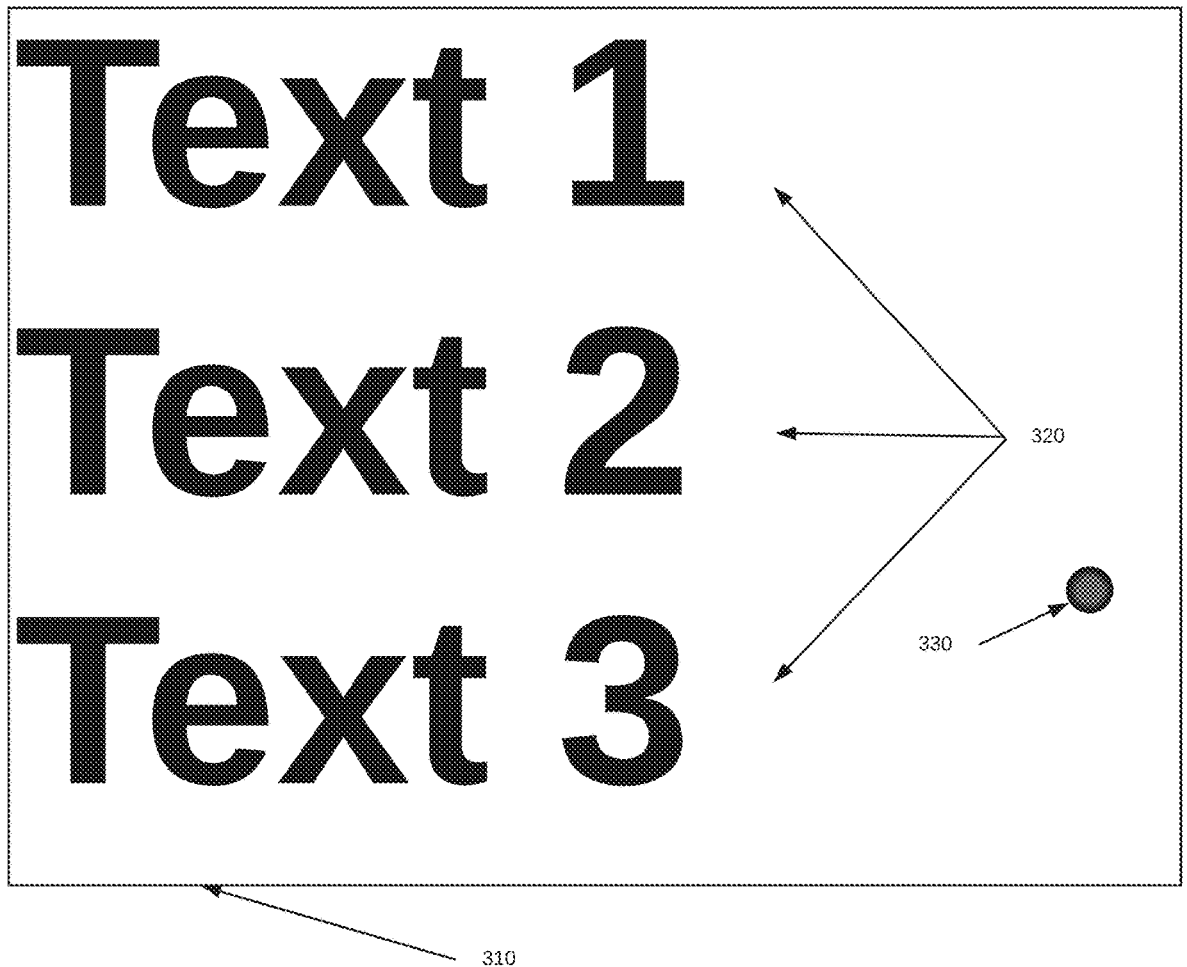
FIG. 3 depicts an example of a portion of a label containing a coffee ring dot in accordance with an embodiment.

FIG. 3 represents an attempt at showing how a coffee dot might appear if printed separately on a label. The drawing is not to scale, but the intent here is to show an inkjet dot appearing on a label, separately from other printed text on the label. In FIG. 3, a magnified portion 310 of a label has several lines of text 320. A coffee ring dot 330 is shown, separate from the text lines 320. The dot 330 is shown somewhat larger than if it were part of one of the text lines 320, so that at least some of the coffee ring pattern may be visible.

Figure 4:
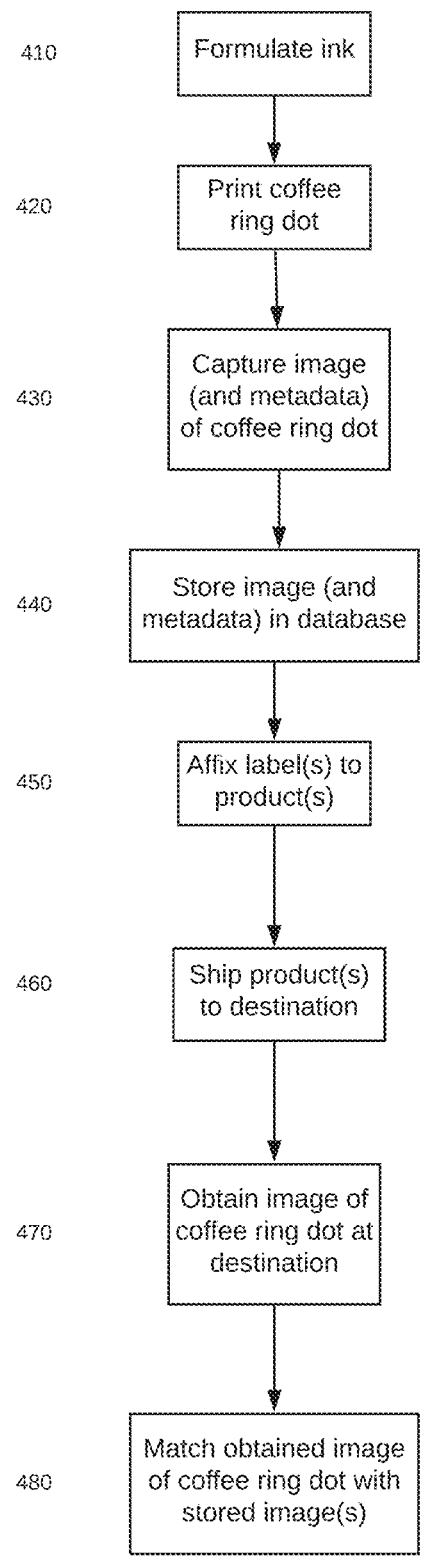
FIG. 4 is a flow chart depicting aspects of the invention according to an embodiment.

FIG. 4 shows a flow chart with an overall sequence of operations. Ordinarily skilled artisans will appreciate that some embodiments of the invention will involve the formulation of the inkjet dot. Other embodiments may will involve the printing of the inkjet dot, and the recording of the image of that dot, including possibly metadata associated with the dot. Still other embodiments will involve the capturing of another image of that dot, including possibly metadata associated with that image capture, followed by comparison of that image capture and metadata with stored image and metadata.

At 410, in an embodiment, specially prepared ink may be used to enhance the coffee ring appearance, though such enhancement is not essential to the implementation of aspects of the invention. At 410, ink may be formulated by adding particles, such as metallic nanoparticles, carbon nanoparticle, CNT, dye, or the like to form optically imageable coffee-rings. The formulation may take advantage of particular paper characteristics, including but not limited to porosity (to facilitate the spread of the coffee ring image) or color (to increase contrast). Climatic conditions at the location of the printer also may play a role.

At 420, a coffee-ring dot (0.1 mm to perhaps a few mm in diameter) may be printed onto a label or package by an inkjet printer. In an embodiment. the dot will be large enough for a smartphone camera to capture an image of the dot reliably.

At 430, an image of the coffee-ring dot on the labels and packages may be obtained, using, for example, a camera, scanner, or other image capturing device. In one aspect, the image capturing device may be conventional, with no special features, properties, or functions. In an embodiment, metadata also may be captured. Exemplary metadata may include date and time; geographic location at which the image is taken; shipping destination; location of plant at which the product and/or label is manufactured; product serial number(s); date(s) of manufacture; and/or identifying information about the printer.

At 440, the coffee-ring image and, where applicable, the metadata, may be stored in a database. In one aspect, the product manufacturer will retain the database. Whoever retains and maintains the database should take appropriate steps to preserve the integrity and security of the stored data.

At 450, the label(s) with the coffee ring dot may be attached to the product(s) that require authentication. In different embodiments, each product may have its own label, or a pallet of products may have its own label.

At 460, though not necessarily an aspect of implementation of embodiments, products containing the coffee ring dot may be shipped to a destination. In an embodiment, the shipping destination may be logged into the database that stores the image and metadata, or may be stored separately, as additional metadata.

At 470, at the shipping destination, a purchaser or potential purchaser, or a warehouse or middleperson storing the product(s) for later shipment or sale, may record an image of a coffee ring dot on a product. Along with the image, associated metadata may be recorded, including the geographic location. If the image capture device at the destination is a smartphone, for example, the device may include a GPS or other location tracking system, with the recorded location being part of the metadata. The image capture device at the shipping destination may or may not have optical or digital zoom capabilities to enlarge the image of the dot. In an embodiment, any necessary enlargement or magnification may be done at a location other than the location at which the image is captured.

At 480, the image captured at 470 may be sent to a data center or some kind of central system or repository for comparison with stored data in order to provide authentication of the product. Various types of data may be included in the authentication. The coffee ring dot itself may suffice in some embodiments. In other embodiments, metadata including the location at which the image was captured may be included, to verify that the product(s) associated with the dot are in fact at their intended destination.

Ordinarily skilled artisans will appreciate that, for large manufacturers with a great number of products and/or large volumes of individual products which may be shipped worldwide, the authentication process can become a "Big Data" problem. One approach to that problem may involve using metadata, for example, the shipping destination. Another approach might be to train a system to recognize coffee ring dots that come from a particular printer. While there may be variations in such coffee ring dots from a given inkjet printer for any or all of the reasons discussed earlier, in one aspect there may be sufficient commonality to provide a body of training data to enable a neural network to recognize the variations as coming from the same printer.

Figure 5:
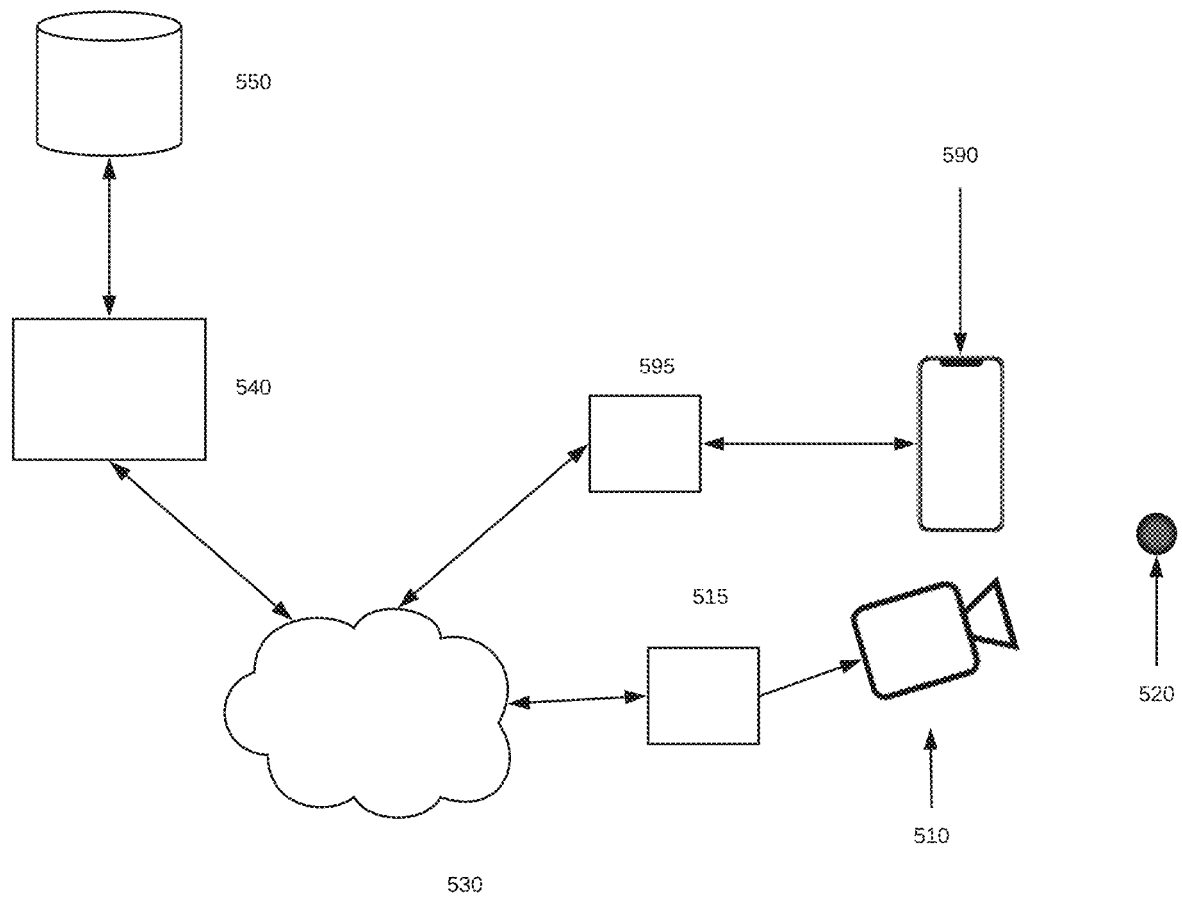
FIG. 5 is a very high level block diagram of a system

FIG. 5 is a very high level system diagram to implement aspects of the invention. Camera or other imaging device 510, which may be at a location at which products are manufactured, or from which products are to be shipped, may capture an image of inkjet coffee ring dot 520 on a product or pallet label. In an embodiment, imaging device 510 may be a smartphone or tablet. The imaging device 510 communicates with computing system 540, to which storage facility 550 is attached, through communications facility 530, to transmit the image of inkjet coffee ring dot 520 for storage. Storage facility 550 may be integral with computing system 540, or may be separate. Communications facility 530 may include any form of wired or wireless communication. In an embodiment, computing system 540 and storage facility 550 are part of a cloud-based system.

When imaging device 510 takes an image of the dot 520, metadata of the type described above may be included, and stored along with the image. If imaging device 510 is a standalone imaging device, imaging device 510 may work with computing apparatus 515 to obtain metadata of the type discussed previously, and communicate that metadata for storage with an accompanying image.

At the product or pallet destination, camera or other imaging device 590 may take an image of dot 520. For compactness of description, FIG. 5 shows both the imaging device 510 at the product manufacture or shipping origin, and the imaging device 590 at the destination, but it should be understood that these two devices in most cases will be in different locations. In FIG. 5, device 590 is shown as a smartphone, merely as an exemplary embodiment. The device 590 also may obtain metadata of the type discussed previously. As part of a smartphone or tablet, the device 590 may communicate directly with computing system 540 to confirm the authenticity of the product(s) or pallet bearing label(s) with dot(s) 520. Alternatively, if imaging device 590 is a standalone imaging device, communication to confirm authenticity may be effected through computing apparatus 595.

While the foregoing describes embodiments according to aspects of the invention, the invention is not to be considered as limited to those embodiments or aspects. Ordinarily skilled artisans will appreciate variants of the invention within the scope and spirit of the appended claims.

What is claimed is:

1. A method comprising:
   capturing at least one indicium identifying an item by obtaining a first image of a mark on the item or its packaging, the mark being a dot from an inkjet printer, and specific to the inkjet printer used to make the mark;
   storing the first image; and
   responsive to receipt of a second image that is purported to contain a dot from the inkjet printer and thereby to identify the item:
   comparing the first and second images; and
   responsive to a match between the first and second images, verifying authenticity of the item;
   wherein the dot has an outer periphery having a shape resembling a coffee ring.

2. A method as claimed in claim 1, further comprising:
   capturing first metadata regarding the inkjet printer;
   storing the first metadata regarding the inkjet printer; and
   responsive to receipt of second metadata that is purported to identify the inkjet printer:
   comparing the first and second metadata, and
   responsive to a match between the first and second metadata, further verifying authenticity of the item.

3. A method as claimed in claim 2, wherein the first and second metadata regarding the inkjet printer comprises data selected from the group consisting of printer serial number, printer physical location, and printer IP address.

4. A method as claimed in claim 1, further comprising:
   capturing first metadata regarding the item;
   storing the first metadata regarding the item; and
   responsive to receipt of second metadata that is purported to identify the item:
   comparing the first and second metadata, and
   responsive to a match between the first and second metadata, further verifying authenticity of the item.

5. A method as claimed in claim 4, wherein the first metadata regarding the item comprises data selected from the group consisting of item serial number, item date of manufacture, item location of manufacture, item preliminary warehousing location, and item point of sale location.

6. A method as claimed in claim 1, wherein the item comprises a product.

7. A method as claimed in claim 1, wherein the item comprises a pallet of products.

8. A method as claimed in claim 1, further comprising performing the capturing and storing of the first image for each of a plurality of products bearing the dot on the products or the products' packaging; and
   responsive to receipt of a second image that is purported to contain a dot from the inkjet printer and thereby to identify the item:
   comparing the second image with the first images; and
   responsive to a match between the second image and one of the first images, verifying authenticity of the item.

9. A method as claimed in claim 1, further comprising adding ingredients to ink in the inkjet printer to enhance the shape to resemble a coffee ring more closely.

10. A method as claimed in claim 1, further comprising
    repeating the capturing and storing for a plurality of indicia corresponding to a plurality of products, the plurality of indicia comprising dots from at least one inkjet printer; and
    repeating the comparing and verifying for the plurality of products.

11. A computer-implemented system to perform a method comprising:
    capturing at least one indicium identifying an item by obtaining a first image of a mark on the item or its packaging, the mark being a dot from an inkjet printer, and specific to the inkjet printer used to make the mark;
    storing the first image; and
    responsive to receipt of a second image that is purported to contain a dot from the inkjet printer and thereby to identify the item:
    comparing the first and second images; and
    responsive to a match between the first and second images, verifying authenticity of the item;
    wherein the dot has an outer periphery having a shape resembling a coffee ring.

12. A computer-implemented system as claimed in claim 11, the method further comprising:
    capturing first metadata regarding the inkjet printer;
    storing the first metadata regarding the inkjet printer; and
    responsive to receipt of second metadata that is purported to identify the inkjet printer:
    comparing the first and second metadata, and
    responsive to a match between the first and second metadata, further verifying authenticity of the item.

13. A computer-implemented system as claimed in claim 12, wherein the first and second metadata regarding the inkjet printer comprises data selected from the group consisting of printer serial number, printer physical location, and printer IP address.

14. A computer-implemented system as claimed in claim 11, the method further comprising:
    capturing first metadata regarding the item;
    storing the first metadata regarding the item; and
    responsive to receipt of second metadata that is purported to identify the item:
    comparing the first and second metadata, and
    responsive to a match between the first and second metadata, further verifying authenticity of the item.

15. A computer-implemented system as claimed in claim 14, wherein the first metadata regarding the item comprises data selected from the group consisting of item serial number, item date of manufacture, item location of manufacture, item preliminary warehousing location, and item point of sale location.

16. A computer-implemented system as claimed in claim 11, wherein the item comprises a product.

17. A computer-implemented system as claimed in claim 11, wherein the item comprises a pallet of products.

18. A computer-implemented system as claimed in claim 11, the method further comprising performing the capturing and storing of the first image for each of a plurality of products bearing the dot on the products or the products' packaging; and
    responsive to receipt of a second image that is purported to contain a dot from the inkjet printer and thereby to identify the item:
    comparing the second image with the first images; and responsive to a match between the second image and one of the first images, verifying authenticity of the item.

19. A computer-implemented system as claimed in claim 11, the method further comprising adding ingredients to ink in the inkjet printer to enhance the shape to resemble a coffee ring more closely.

20. A computer-implemented system as claimed in claim 11, the method further comprising:
   repeating the capturing and storing for a plurality of indicia corresponding to a plurality of products, the plurality of indicia comprising dots from at least one inkjet printer; and
   repeating the comparing and verifying for the plurality of products.

* * * * *